June 24, 1930.  A. C. FINER  1,768,043
TOILET MIRROR
Filed July 6, 1927

Inventor –
A. C. Finer
By [signature] Atty.

Patented June 24, 1930

1,768,043

UNITED STATES PATENT OFFICE

AUBREY CLARENCE FINER, OF LONDON, ENGLAND

TOILET MIRROR

Application filed July 6, 1927, Serial No. 203,849, and in Great Britain November 17, 1926.

This invention relates to toilet mirrors of the kind mounted in the front part of a casing containing a source of light which is shielded by the mirror except for a transparent or translucent area surrounding the mirror, said casing having a reflector device behind the source of light.

The present invention provides for a toilet mirror wherein a plain silvered backed mirror, with part of the silvering removed to form a clear-glass area, is mounted in the hinged front of a casing, a shield being interposed between said mirror and the source of light to prevent the destruction of the silvering by the heat from the source of light, the casing having a reflector device behind said source of light.

It forms a feature of the invention that the source of light (an incandescent electric bulb) is supported from an inner wall of the casing, and that the shield may constitute an additional reflector device to throw reflected rays back on to the back reflector, and that a switch is provided on the casing for switching "on" and "off" the light.

The invention is illustrated by the accompanying drawings, wherein:—

Figure 1:
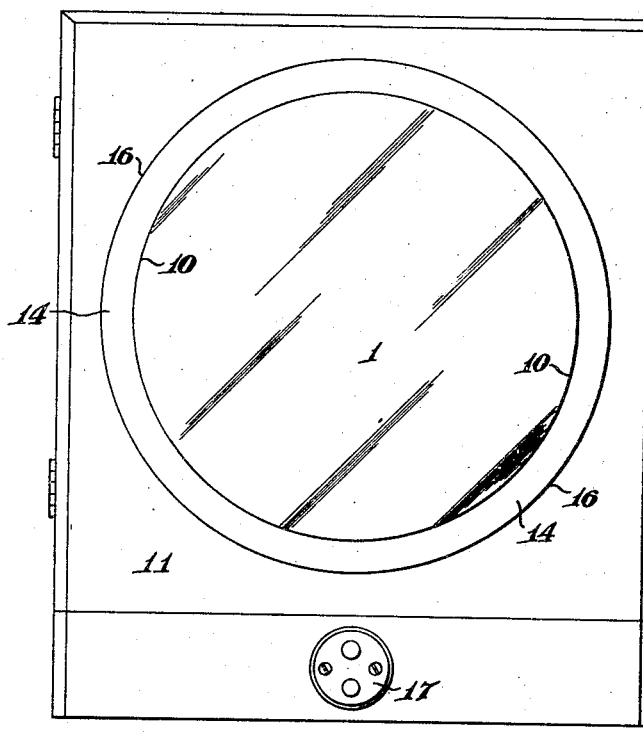
Figure 2:
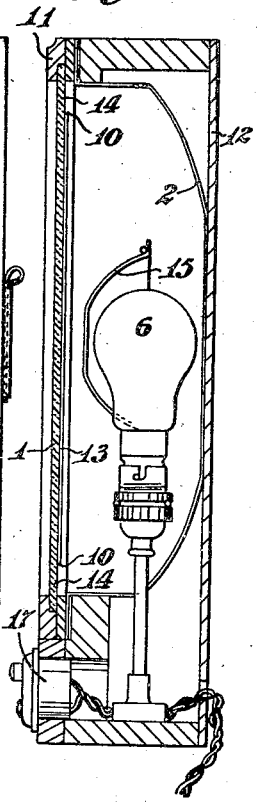

Figure 1 is a front view of a toilet mirror in accordance with the invention, and, Figure 2 is a central vertical sectional view thereof.

Referring to the drawings, the mirror 1 is mounted in the hinged front 11 of a casing 12 adapted to be affixed to the wall of a cabin, or it may be other wall, and part of the silvering 13, i. e. the back of said mirror 1 is removed to leave a clear-glass area 14. The illuminant 6 is supported, vertically, from the bottom of the casing 12 and in front of a reflector 2. A shield 15, which shield may constitute a reflector, facing towards the reflector 2, is interposed between the back or silvering 13 of the mirror 1 and the reflector 2, the light reflected from the reflector 2 passing through the clear-glass area 14 between the edge 10 of the silvering 13, i. e. the mirror, and the edge 16 of the hinged front 11 of the casing 12 on to one's face, lighting up the same which is clearly visible in the mirror 1 without direct rays being cast onto one's face, any convenient arrangement of switch 17 being provided on the casing 12 for switching "on" or "off" the light.

I claim:—

1. In a device of the class described, a sheet of transparent material having a central portion thereof silvered on the back to provide a mirror and having the marginal portion thereof unsilvered, a lamp positioned behind the silvered portion of said transparent sheet, a reflector to direct light rays from said lamp through the marginal unsilvered portion of said sheet, and a shield interposed between said lamp and the silvered portion of the sheet and spaced from the latter, said shield being dished and substantially one-half of the lamp being disposed within said shield to insure interception of all rays directed forwardly from the lamp.

2. In a device of the class described, a sheet of transparent material having a central portion thereof silvered on the back to provide a mirror and having the marginal portion thereof unsilvered, a lamp positioned behind the silvered portion of said transparent sheet, a reflector to direct light rays from said lamp through the marginal unsilvered portion of said sheet, and a shield interposed between said lamp and the silvered portion of the sheet and spaced from the latter, said shield being dished and substantially one-half of the lamp being disposed within said shield to insure interception of all rays directed forwardly from the lamp, said shield constituting a reflector effective to direct light rays from said lamp onto said first mentioned reflector.

In testimony whereof I have affixed my signature hereto this 8th day of June, 1927.

AUBREY CLARENCE FINER.